United States Patent
Riccardi

(10) Patent No.: US 7,585,354 B2
(45) Date of Patent: Sep. 8, 2009

(54) WET SCRUBBING APPARATUS AND METHOD

(76) Inventor: Nicola Riccardi, Via Piave, 6, I-20040 Burago Molgora, Milan (IT)

( * ) Notice: Subject to any disclaimer, the term of this patent is extended or adjusted under 35 U.S.C. 154(b) by 400 days.

(21) Appl. No.: 10/547,522

(22) PCT Filed: Mar. 12, 2004

(86) PCT No.: PCT/IB2004/000705

§ 371 (c)(1),
(2), (4) Date: Jul. 3, 2006

(87) PCT Pub. No.: WO2004/080572

PCT Pub. Date: Sep. 23, 2004

(65) Prior Publication Data

US 2006/0249028 A1    Nov. 9, 2006

(30) Foreign Application Priority Data

Mar. 13, 2003   (IT)  .............................. MI03A0476

(51) Int. Cl.
    *B01D 47/06* (2006.01)
(52) U.S. Cl. .............................. 95/196; 95/224; 96/322
(58) Field of Classification Search ............ 95/149, 95/187, 195–197, 205, 217, 224; 96/322, 96/271

See application file for complete search history.

(56) References Cited

U.S. PATENT DOCUMENTS

| | | | | |
|---|---|---|---|---|
| 2,687,780 A | * | 8/1954 | Culhane | 96/319 |
| 3,324,632 A | * | 6/1967 | Berneike et al. | 96/303 |
| 3,370,402 A | * | 2/1968 | Nakai et al. | 95/196 |
| 3,766,716 A | * | 10/1973 | Ruiz | 96/131 |
| 3,768,234 A | * | 10/1973 | Hardison | 96/253 |
| 3,923,480 A | * | 12/1975 | Visch | 96/360 |
| 4,005,999 A | * | 2/1977 | Carlson | 95/221 |
| 4,511,379 A | | 4/1985 | Hauptmann | |
| 5,181,944 A | * | 1/1993 | Jarvenpaa | 96/304 |
| 6,036,756 A | | 3/2000 | Gohara et al. | |
| 6,521,027 B1 | | 2/2003 | Wang | |
| 2004/0255779 A1 | * | 12/2004 | Trivett | 95/226 |

* cited by examiner

*Primary Examiner*—Frank M Lawrence
(74) *Attorney, Agent, or Firm*—James V. Costigan; Hedman & Costigan, P.C.

(57) ABSTRACT

In order to provide a phase detector and a method of phase detection which are distinguished by greater sensitivity and simple implementability, at least one differential signal of two input signals ($U_a$; $U_b$) may be formed over at least one predefined period by means of a first subtracter (12), at least one maximum value of the at least one differential signal may be detected by means of a first peak detector (16) and at least one minimum value of the at least one differential signal may be detected by means of a second peak detector (18) and at least one further differential signal ($U_{Out}$) may be formed from the at least one maximum value and the at least one minimum value by means of a second subtracter (14).

6 Claims, 6 Drawing Sheets

WET SCRUBBING APPARATUS AND METHOD

CROSS-REFERENCE TO RELATED APPLICATIONS

Not Applicable

STATEMENT REGARDING FEDERALLY SPONSORED RESEARCH OR DEVELOPMENT

Not Applicable

INCORARATION-BY-REFERENCE OF MATERIAL SUBMITTED ON A COMPACT DESK

Not Applicable

REFERENCE TO A MICROFICHE APPENDIX

Not Applicable

BACKGROUND OF THE INVENTION

1. Field of the Invention

The present invention addresses an apparatus and a method for wet scrubbing of pollutants in air and flue gases.

2. Description of Related Art

Wet scrubbing apparatuses are known for removing particulates from flue gases and air.

Although these apparatuses have been known for several years, they still have a variety of drawbacks, which prevent a wide use thereof.

Particularly, prior art wet scrubbing apparatuses are rather massive and poorly efficient and have considerable maintenance requirements.

On the other hand, flue gas and air purification in work environments is an increasingly critical issue.

The object of the present invention is to obviate, at least partially, the drawbacks of prior art and particularly, the above mentioned drawbacks.

BRIEF SUMMARY OF THE INVENTION

This object is fulfilled by a wet scrubbing apparatus and method as herein below disclosed.

Further advantages of the apparatus may be obtained by the additional characteristics of the dependent claims.

Thus, from the above disclosure, it should be apparent that the invention also provides a wet scrubbing method for wet scrubbing pollutants in air and gases by an apparatus according to claim 1, said method including the steps of generating a stream of gases and causing said stream of gases to flow up through a central chamber and repeatedly flow up and down through a succession of concentric chambers, at least one of said concentric chambers being equipped with at least one wire gauze partition disposed transversely through which the gases and water droplets are forced;

causing said stream of gases to sequentially flow from said central chamber to said concentric chambers;

spraying, by spraying nozzles, washing water into said concentric chambers, thereby subjecting said stream of gases to a wash and backwash action;

collecting said washing water in a collecting tank;

filtering, in a filtering tank, the collected washing water to provide filtered water therefrom suspended particles have been removed; and recirculating said filtered water to said spraying nozzles.

BRIEF DESCRIPTION OF THE SEVERAL VIEWS OF THE DRAWINGS

A few possible embodiments of the wet scrubbing apparatus, in accordance with the attached patent claims, will be described hereafter with reference to the drawings, in which:

DETAILED DESCRIPTION OF THE INVENTION

Figure 1:
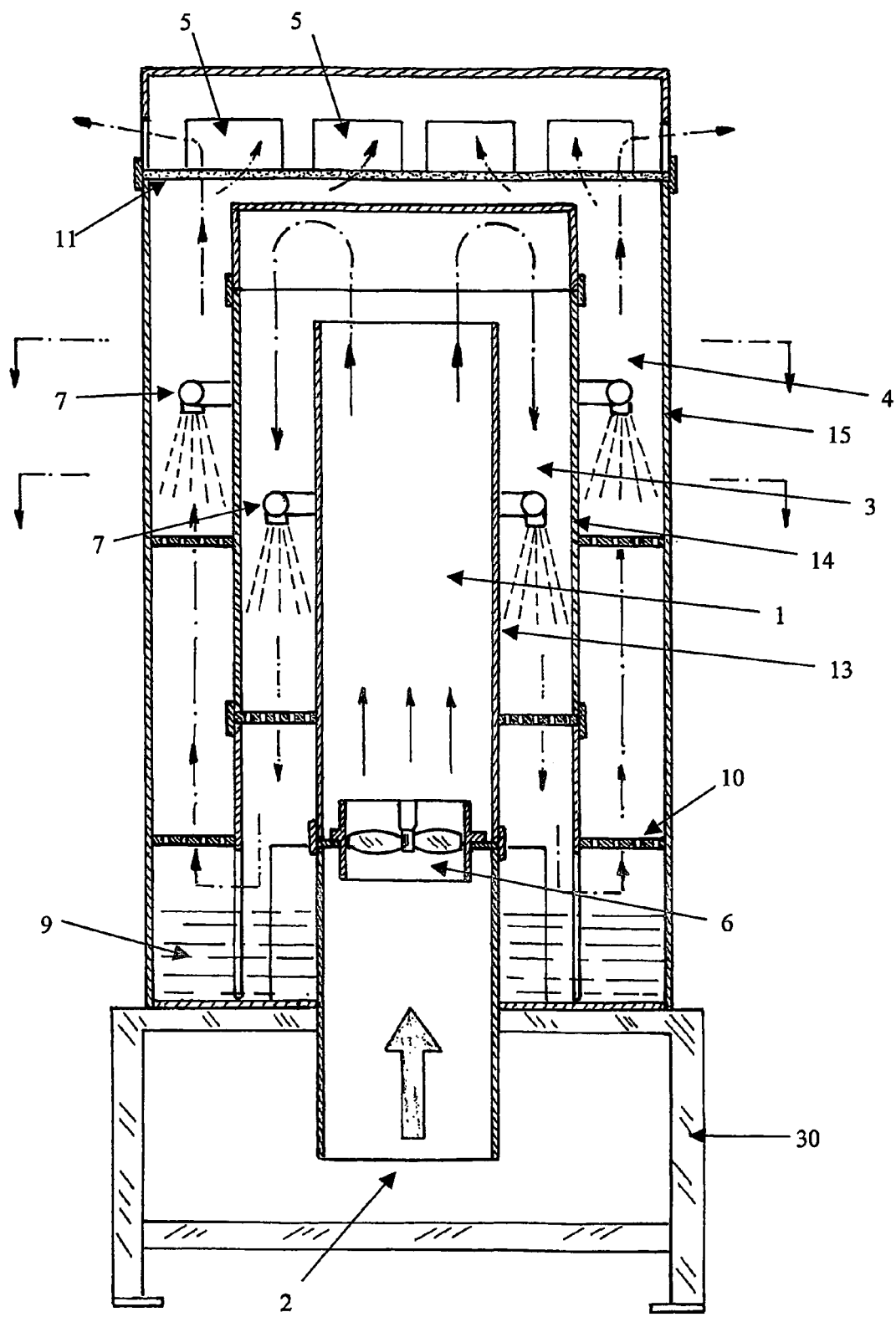
FIG. 1 is a longitudinal sectional view of the apparatus.

Referring to the accompanying drawings, the wet scrubbing apparatus comprises a central chamber 1, which extends in a substantially and/or generally vertical direction, and has an inlet 2 at its bottom for the gas and/or flue gases to be purified.

The central chamber 1 is surrounded by a plurality of chambers 3, 4 in a substantially concentric arrangement around the central chamber 1.

The central chamber 1 and the concentric chambers 3, 4 are connected in series and the outermost concentric chamber 4 has one or more outlets 5.

The central chamber 1 and the concentric chambers 3, 4 are formed by a plurality of elements 13, 14, 15 having a tubular shape or other with square or round section shapes.

Those skilled in the art may envisage different embodiments, to meet the needs of each installation site.

Preferably, tubular elements 13, 14, 15 are made of steel, more preferably of stainless steel.

Those skilled in the art may obviously envisage the use of other materials.

Suitable air delivery means 6 are provided, typically an adjustable-speed fan, situated upstream or downstream from the central chamber 1 or inside it to generate a current of air and/or flue gases that sequentially travels from the central chamber 1 to the concentric chambers 3, 4.

A plurality of nozzles 7, which are fed by a pump 8, spray water into the concentric chambers 3, 4.

Preferably, each chamber 3, 4 has a generally annular manifold 27 which has the nozzles 7 connected thereto.

Figure 2:
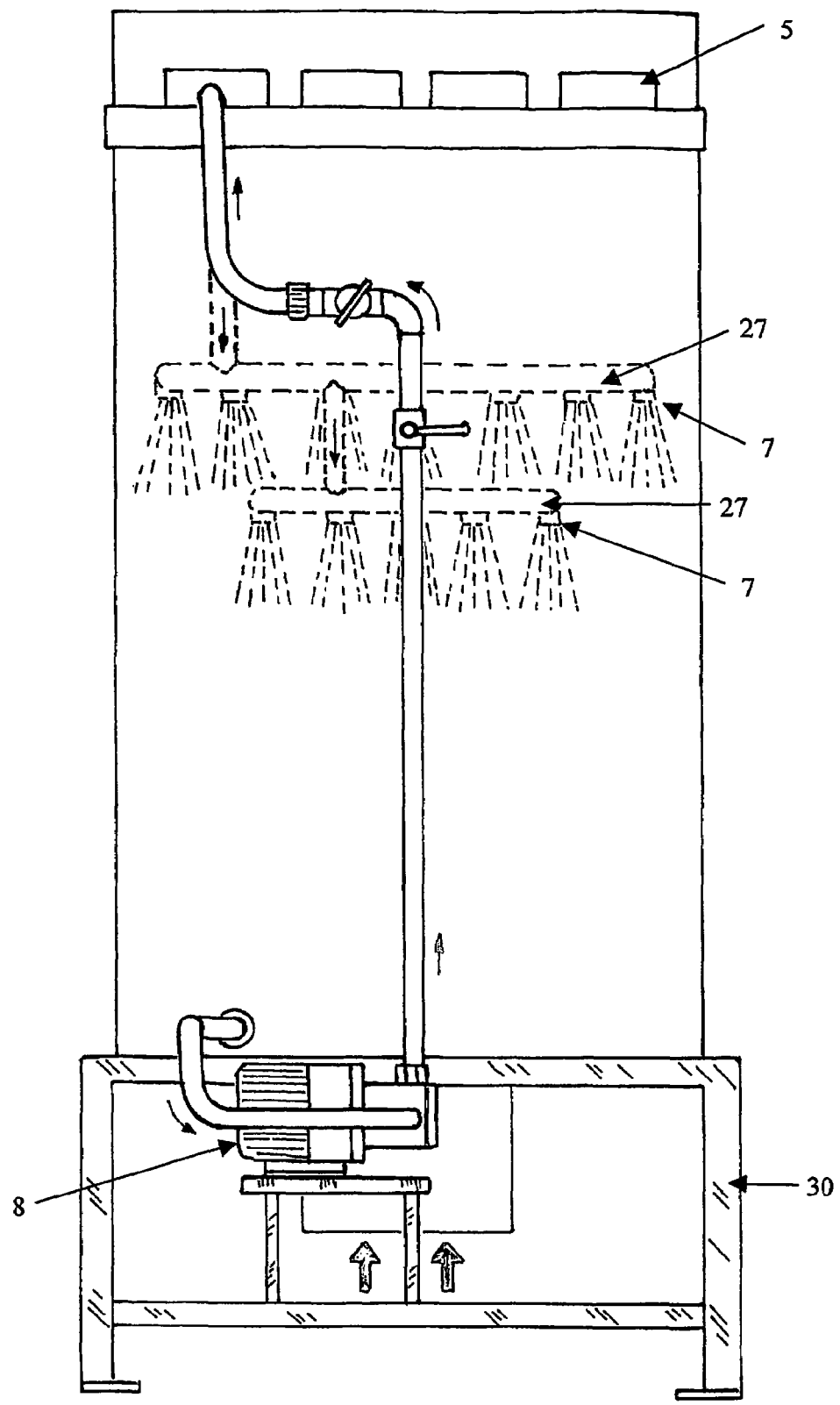
FIG. 2 is a side view of the apparatus.
Figure 3:
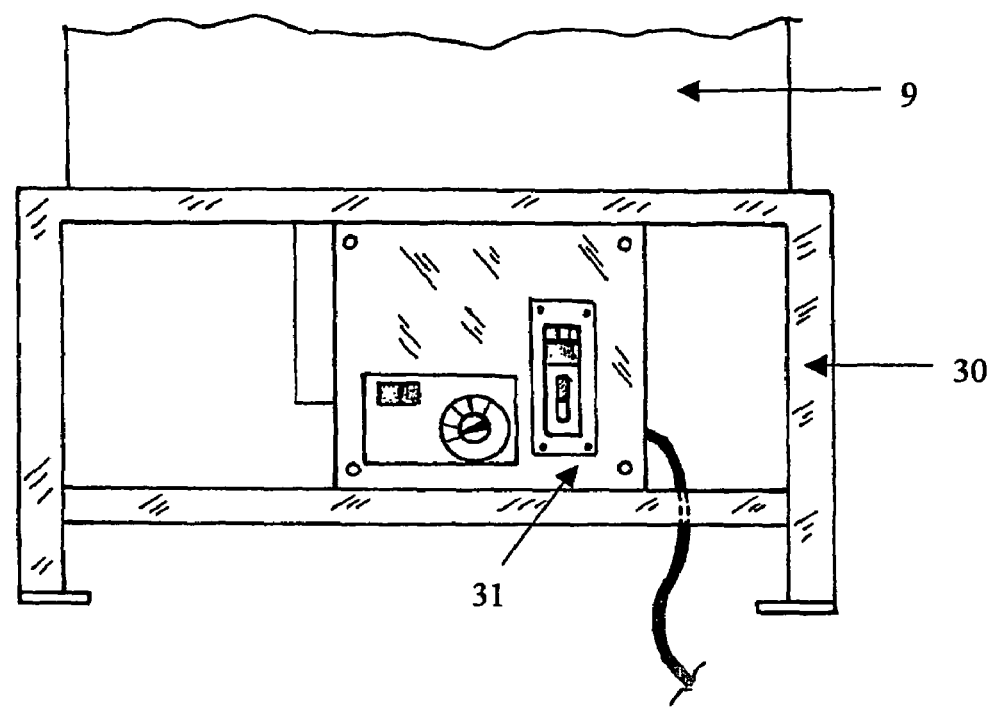
FIG. 3 is a side view of a detail of the apparatus.

In a possible embodiment (FIG. 2) the manifolds 27 which feed the nozzles 7 of the various concentric chambers 3, 4 are connected in series.

Valves may be further provided for separately adjusting the flow rate of the water sprayed into each concentric chamber 3, 4.

The droplets of water sprayed into the concentric chambers 3, 4 retain the particulates contained in air or in the flue gases which travel through the concentric chambers 3, 4 and fall into a water collection tank 9.

The water collected in the tank 9, after being filtered, is delivered again to the nozzles 7.

Figure 4:
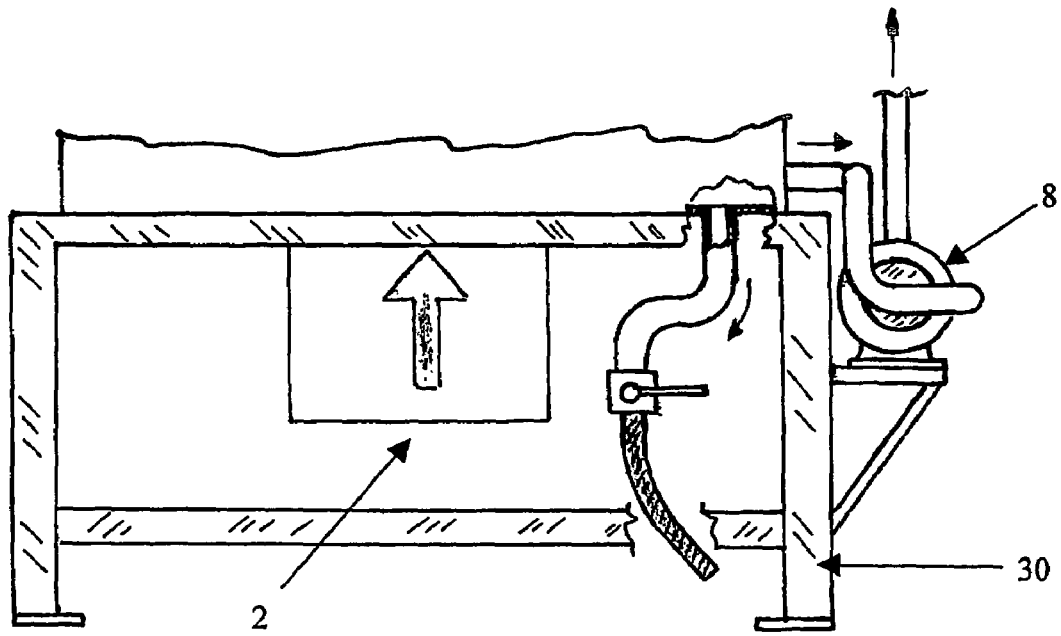
FIG. 4 is a side view of another detail of the apparatus.
Figure 5:
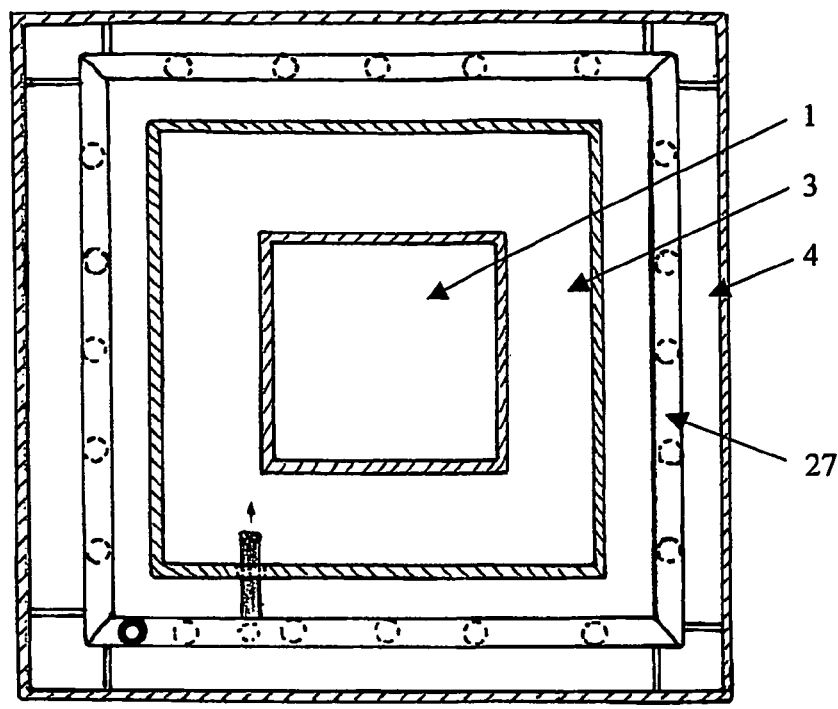
FIG. 5 is a first cross sectional view of the apparatus.

The collection tank 9 may be equipped with a drain valve (see FIG. 4) for draining the tank when needed.

In the apparatus of the invention, the gas and/or flue gas stream flowing up through the central chamber 1, repeatedly flows up and down through the concentric chambers 3, 4 and is alternately subjected to a wash and backwash action.

The provision of a plurality of concentric chambers 3, 4 for repeated gas washing allows to minimize the purification apparatus size without prejudice to performances.

A mechanical filter 11, for instance a layer of nonwoven fabric may be provided at the outlet 5 of the wet scrubber apparatus to retain the residual particulates from the washing process.

Preferably, at least one perforated plate 12 or wire gauze 10 is provided in each concentric chamber 3, 4.

It has been noted that, by forcing flue gases and water droplets through small apertures, the scrubbing power is considerably increased.

In a possible embodiment, which is particularly advantageous for the purification of solid fuel fired boiler gases, wire gauzes 10 have a mesh of not less than 1×1 mm and not more than 10×10 mm.

The mesh of the wire gauze 10 is dependent on the relevant application of the system and on the pollutant to be treated.

In order to considerably improve performances, the gauzes 10 may be mounted in closely spaced pairs, one above the other.

In an alternative embodiment, which is particularly advantageous for the purification of oil-fired or solid combustion boiler gases, perforated plates 12 are mounted in closely spaced pairs, otherwise gauzes 10 are provided in pairs with perforated plates 12.

This arrangement, in oil-fired or solid combustion heaters, has been found to provide a particulate removal of the order of about 88%.

According to the preferred embodiment, the central chamber 1 and the concentric chambers 3, 4 have increasing sections, whereby the gas stream has a decreasing speed as it passes from one chamber to the other.

In fact, a progressive flue gas speed decrease has been found to provide a further flue gas scrubbing increase.

The particulates collected in the tank 9 tend to form a slurry which prevents proper operation of the apparatus.

Therefore, before reuse, the water collected in the tank 9 is transferred to an underlying filtering tank 32, for removal of the suspended particles therefrom.

Then, the filtered water is pumped to the nozzles 7 by a pump 8.

Preferably, the filtering tank 32 includes a plurality of mechanical filters 33, 34, 35, 36 having an increasing filtering degrees, which are arranged in series.

For instance, the first filter 33 may have a filtering degree, as needed, of 250 µm to about 0.61 µm.

This allows to reduce the frequency and duration of filter cleaning and circuit water replacement operations.

The water level in the filtering tank 32 is adjusted by a valve 20, which is driven by a level switch 21.

This allows to compensate for the evaporation of wash water, due to the high temperature of flue gases.

A manually or electrically operated drain valve 22 is further provided to drain the filtering tank 32 when needed.

Figure 6:
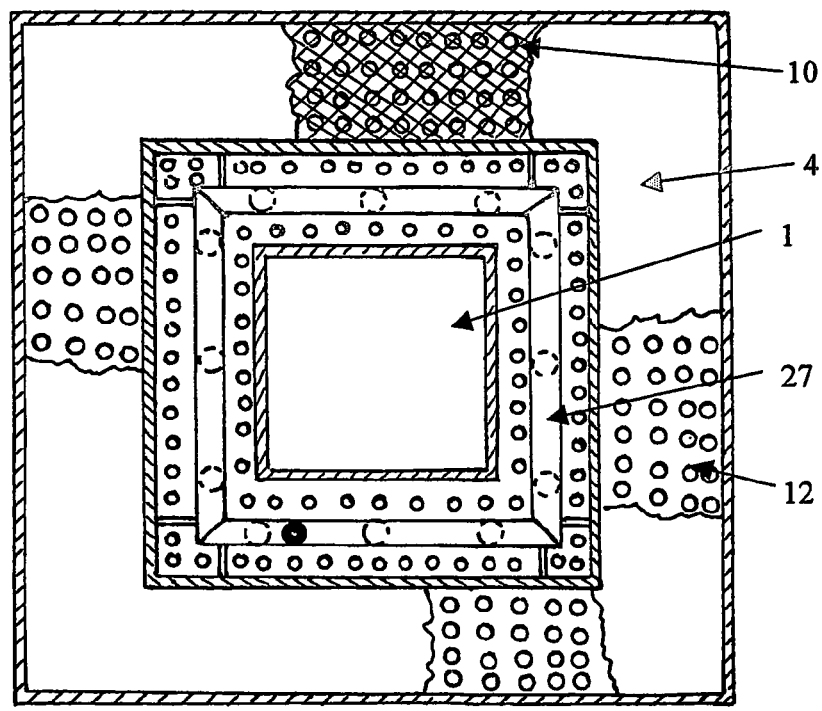
FIG. 6 is a second cross sectional view.
Figure 7:
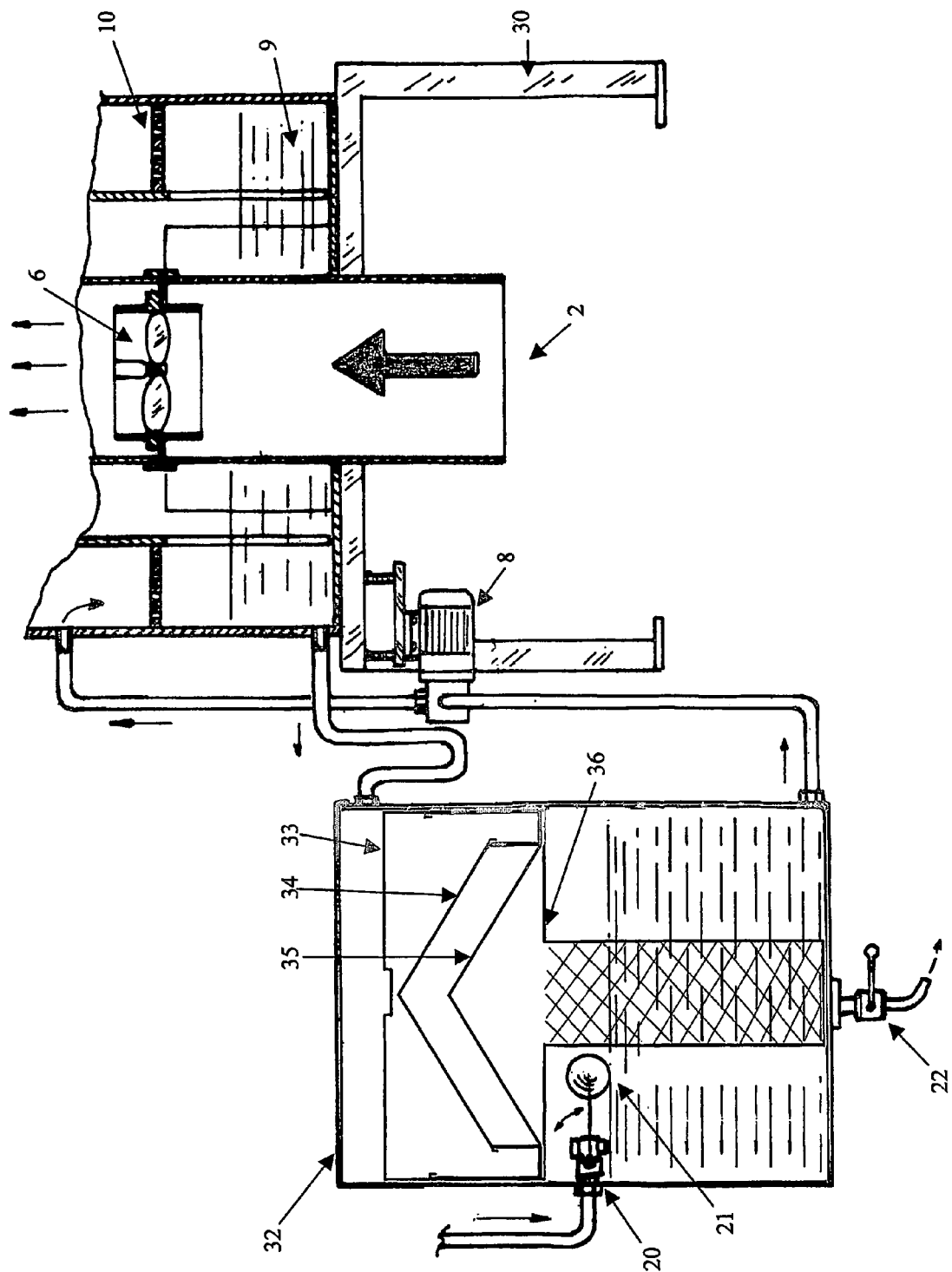
FIG. 7 is a side sectional view of an alternative embodiment of the apparatus.
Figure 8:
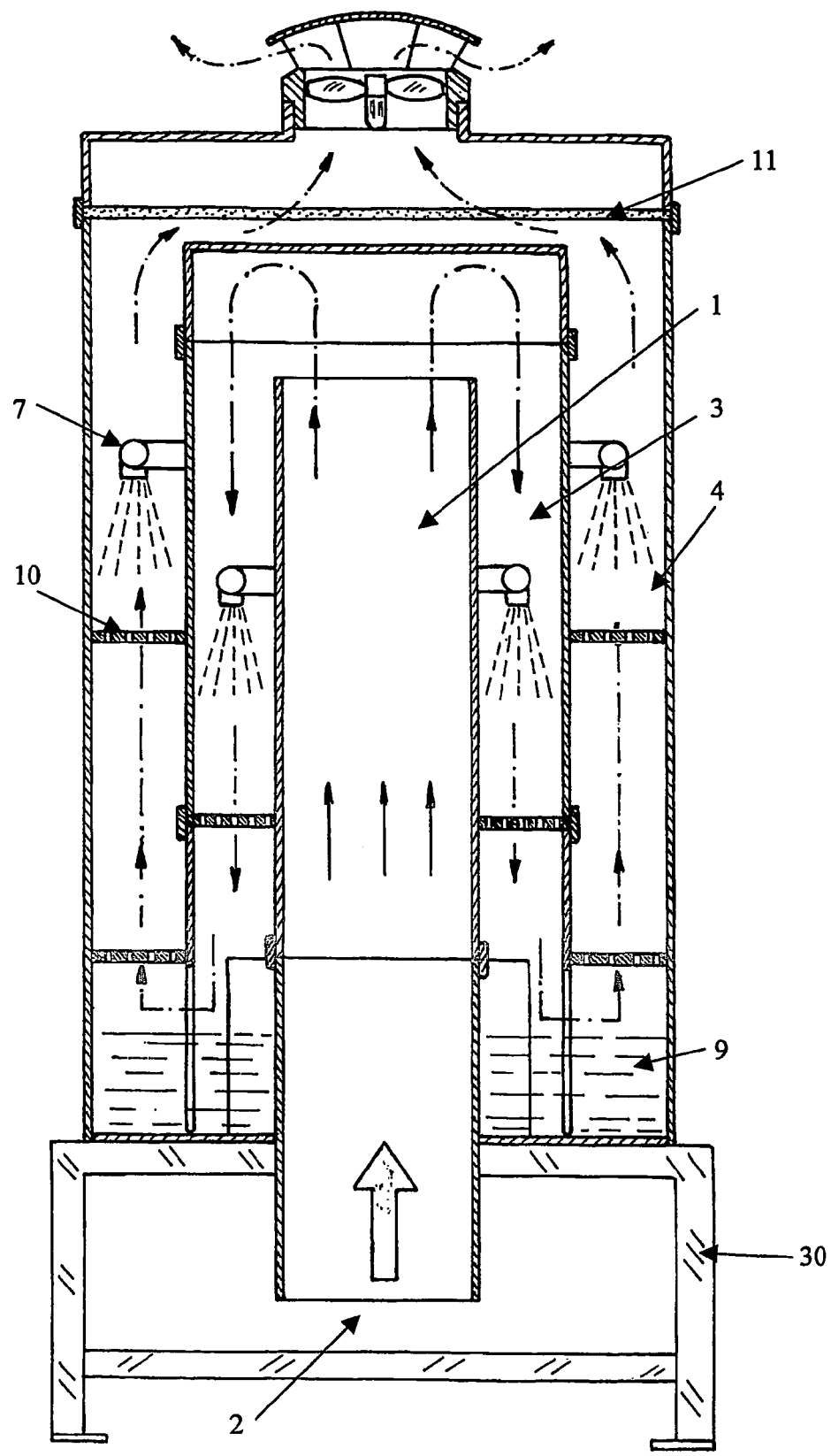
FIG. 8 is a front sectional view of a detail of a further embodiment of the apparatus.

In an alternative embodiment, which is preferred when the apparatus is placed in the vicinity of the stack, the fan 6 is situated downstream from the scrubber apparatus (FIG. 6), i.e. at or near the outlet 5 of the outermost concentric chamber 4.

In an alternative embodiment, not shown, there may be four concentric chambers 3, 4, allowing for a more effective scrubbing effect, and the air delivery means 6 may be disposed either upstream or downstream from the central chamber 1.

Thanks to its versatility, the above described apparatus can be adapted to a variety of needs, particularly for purifying gases from civil or industrial heating boilers, conditioning systems downstream from air intakes, carpenter shops, mechanical or metal and mechanical shops, etc.

According to the embodiments that are shown in the figures, the apparatus is mounted on a special metal frame 30 and has a switchboard 31 which includes a thermomagnetic safety device and a speed control for the fan 6.

The electric panel 31 further includes an audible and visual alarm system, for signaling any failure in the electric and drive system or water missing conditions in the tank 9.

The invention claimed is:

1. A wet scrubbing apparatus for wet scrubbing pollutants in air and gases, comprising:
    a central chamber, which extends in a vertical direction, and has an inlet at its bottom for a gas to be purified;
    a plurality of chambers concentrically arranged around said central chamber;
    said central chamber and said concentric chambers being connected in series and the outermost concentric chamber having one or more outlets, each provided with a mechanical filter;
    air delivery means, situated upstream from said central chamber or inside said central chamber or at the outlet of the outermost concentric chamber to generate a current of gas that sequentially travels from the central chamber to the concentric chambers;
    a plurality of nozzles, for spraying water into said concentric chambers;
    a collection tank for collecting the water sprayed into said concentric chambers;
    a filtering tank, fed by said collection tank, for removing solid particulates which build up in water collected in said collection tank;
    a pump for feeding said plurality of nozzles with water from said filtering tank;
    wherein said central chamber and said concentric chambers have increasing sections, whereby the gas stream has a decreasing speed as it passes from one chamber to the other;
    wherein at least one of said concentric chambers is equipped with at least one wire gauze partition disposed transversely through which flue gas and water droplets are forced, and
    wherein said wire gauze partition comprises a wire gauze having a mesh of not less than 1 ×1 mm and not more than 10 ×10 mm.

2. A wet scrubbing apparatus according to claim 1, wherein said wire gauze partitions are mounted in closely spaced pairs one above the other.

3. A wet scrubbing apparatus according to claim 1, wherein each said wire gauze partition is arranged in a closely spaced pair with a perforated plate.

4. A wet scrubbing apparatus according to claim 1, wherein said mechanical filter comprises a plurality of series arranged filters a first of said filters having a filtering degree from 250 µm to about 0.61 µm, arranged in series.

5. A wet scrubbing apparatus according to claim 1, further including means for separately adjusting the flow rate of the water sprayed into each concentric chamber.

6. A wet scrubbing method for wet scrubbing pollutants in air and gases by an apparatus according to claim 1, said method including the steps of generating a stream of gases and causing said stream of gases to flow up through a central chamber and repeatedly flow up and down through a succession of concentric chambers, at least one of said concentric chambers being equipped with at least one wire gauze partition disposed transversely through which the gases and water droplets are forced;

causing said stream of gases to sequentially flow from said central chamber to said concentric chambers;

spraying, by spraying nozzles, washing water into said concentric chambers, thereby subjecting said stream of gases to a. wash and backwash action;

collecting said washing water in a collecting tank;

filtering, in a filtering tank, the collected washing water to provide filtered water therefrom suspended particles have been removed; and recirculating said filtered water to said spraying nozzles.

* * * * *